(12) United States Patent
Ivanov et al.

(10) Patent No.: US 12,189,158 B2
(45) Date of Patent: Jan. 7, 2025

(54) OPTICAL MULTI-PASS IMAGING DEVICE BASED ON POLARIZATION ELEMENTS AND OPTICAL IMAGE CAPTURING SYSTEM FOR ELECTRONIC MOBILE DEVICES

(71) Applicant: SAMSUNG ELECTRONICS CO., LTD., Suwon-si (KR)

(72) Inventors: Stepan Evgenievich Ivanov, Saint-Petersburg (RU); Aleksander Victorovich Morozov, Moscow (RU); Andrey Aleksandrovich Manko, Moscow (RU)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 601 days.

(21) Appl. No.: 17/341,835

(22) Filed: Jun. 8, 2021

(65) Prior Publication Data

US 2021/0396920 A1   Dec. 23, 2021

(30) Foreign Application Priority Data

Jun. 18, 2020  (RU) ................................ 2020120222
Mar. 8, 2021  (KR) ........................ 10-2021-0029918

(51) Int. Cl.
  *G02B 5/30*    (2006.01)
  *G02B 5/00*    (2006.01)
  (Continued)

(52) U.S. Cl.
  CPC ........... *G02B 5/3016* (2013.01); *G02B 5/208* (2013.01); *G02B 27/286* (2013.01); *G02B 5/005* (2013.01)

(58) Field of Classification Search
  CPC ...... G02B 5/3016; G02B 5/208; G02B 5/005; G02B 5/30; G02B 5/3025; G02B 5/3058; G02B 5/3083; G02B 27/286; G02B 27/28; G02B 27/283; G02B 17/004; G02B 17/02; G02B 17/023; G02B 17/06;
  (Continued)

(56) References Cited

U.S. PATENT DOCUMENTS 3,443,858 A   5/1969  La Russa
5,325,218 A   6/1994  Willett et al.
(Continued)

FOREIGN PATENT DOCUMENTS

CN   107564933 A   1/2018
EP   2 006 750 A9   12/2008
(Continued)

*Primary Examiner* — Stephone B Allen
*Assistant Examiner* — Adam W Booher
(74) *Attorney, Agent, or Firm* — Sughrue Mion, PLLC

(57) ABSTRACT

Provided is an optical multi-pass imaging device including an aperture diaphragm (AD), and an optical element block including a front surface facing an object on which the AD is disposed and a back surface facing an image plane, the optical element block being optically coupled with the AD, wherein the optical element block includes at least one lens element, a wire grid polarizer (WGP), a quarter wave plate (QWP), and a cholesteric liquid crystal (ChLC) layer, wherein the WGP, the at least one lens element, the QWP, and the ChLC layer are disposed to provide a predetermined multi-transmission of radiation light from an object side to the image plane.

20 Claims, 14 Drawing Sheets

(51) Int. Cl.
*G02B 5/20* (2006.01)
*G02B 27/28* (2006.01)

(58) Field of Classification Search
CPC ............... G02B 17/0605; G02B 17/08; G02B 17/0804; G02B 17/0856; G02B 17/086
See application file for complete search history.

(56) References Cited

U.S. PATENT DOCUMENTS

| | | | |
|---|---|---|---|
| 5,638,219 | A | 6/1997 | Medina Puerta et al. |
| 5,853,240 | A | 12/1998 | Tanaka et al. |
| 6,008,947 | A | 12/1999 | Togino |
| 6,563,638 | B2 | 5/2003 | King et al. |
| 6,879,356 | B2 * | 4/2005 | Hsieh et al. |
| 9,380,220 | B2 * | 6/2016 | Davis ........................ G03B 7/00 |
| 2004/0012753 | A1 * | 1/2004 | Udaka .................... H04N 23/75 |
| | | | 349/187 |
| 2005/0117095 | A1 | 6/2005 | Ma |
| 2018/0358576 | A1 | 12/2018 | Song et al. |
| 2019/0243147 | A1 | 8/2019 | Smithwick et al. |
| 2020/0142254 | A1 * | 5/2020 | Ryu .................. G02F 1/133528 |
| 2022/0373729 | A1 * | 11/2022 | Yonemoto ............ C09K 19/601 |

FOREIGN PATENT DOCUMENTS

| | | |
|---|---|---|
| JP | 2005-017379 A | 1/2005 |
| KR | 10-2018-0125377 A | 11/2018 |
| KR | 10-2070627 B1 | 1/2020 |
| RU | 2 473 935 C1 | 1/2013 |
| RU | 2 659 577 C1 | 7/2018 |
| WO | 2018/211405 A2 | 11/2018 |

* cited by examiner

Polymeric cholesteric liquid crystalline films

OPTICAL MULTI-PASS IMAGING DEVICE BASED ON POLARIZATION ELEMENTS AND OPTICAL IMAGE CAPTURING SYSTEM FOR ELECTRONIC MOBILE DEVICES

CROSS-REFERENCE TO RELATED APPLICATIONS

This application claims priority to Russian Patent Application No. 2020120222 filed on Jun. 18, 2020, in the Russian Federal Service for Intellectual Property, and Korean Patent Application No. 10-2021-0029918 filed on Mar. 8, 2021, in the Korean Intellectual Property Office, the disclosures of which are incorporated herein by reference in their entireties.

BACKGROUND

1. Field

Example embodiments of the present disclosure relate to an optical image capturing system and an optical multi-pass imaging device based on a polarization element for an electronic mobile device, such as, for example, a mobile phone, a smartphone, and a tablet, and particularly, for a built-in personal digital assistant (PDA) scanner, a web camera, and a portable digital camera.

2. Description of Related Art

A long-focus objective lens of which a focal length greatly exceeds a diagonal length of a frame is widely used for capturing an image of an object at a distance, and particularly, for capturing a portrait. Such an objective lens has an angle of view that is typically from 5 degrees (°) to 20°.

However, the long-focus objective lens may not be readily used and may not be available to be used in a portable electronic device such as a smartphone and a tablet due to its considerable weight and total length (TTL) that may be caused by numerous optical elements. General optical systems such as optical imaging devices and image capturing devices may not satisfy high requirements, for example, low F-number, short TTL, and few optical elements in a system, that are required for an optical imaging device used for a portable electronic device.

Thus, there is a desire for a technology that may maximally satisfy requirements for an optical imaging device used for a portable electronic device.

SUMMARY

One or more example embodiments may address at least the above problems and/or disadvantages and other disadvantages not described above. Also, the example embodiments are not required to overcome the disadvantages described above, and an example embodiment may not overcome any of the problems described above.

According to an aspect of an example embodiment, there is provided an optical multi-pass imaging device including an aperture diaphragm (AD), and an optical element block including a front surface facing an object on which the AD is disposed and a back surface facing an image plane, the optical element block being optically coupled with the AD, wherein the optical element block includes at least one lens element, a wire grid polarizer (WGP), a quarter wave plate (QWP), and a cholesteric liquid crystal (ChLC) layer, wherein the WGP, the at least one lens element, the QWP, and the ChLC layer are disposed to provide a predetermined multi-transmission of radiation light from an object side to the image plane.

The WGP may be disposed in front of or directly on the front surface of the optical element block, the ChLC layer may be disposed behind or directly on the back surface of the optical element block, and the QWP may be disposed between the WGP and the ChLC layer.

The at least one lens element may be configured to refract light that is incident at a predetermined angle, the WGP may be configured to transmit light of a first state of linear polarization and reflect light of a second state of linear polarization, the QWP may be configured to convert the light of the first state of linear polarization to light of a first state of circular polarization, convert the light of the first state of circular polarization to light of the second state of linear polarization, and convert the light of the second state of linear polarization to light of a second state of circular polarization, and the ChLC layer may be configured to reflect the light of the first state of circular polarization and transmit the light of the second state of circular polarization.

One of the first state of linear polarization and the second state of liner polarization may be a P-polarization state and the other of the first state of linear polarization and the second state of linear polarization may be an S-polarization state.

One of the first state of circular polarization and the second state of circular polarization may be a right-handed circular polarization (RCP) state and the other of the first state of circular polarization and the second state of circular polarization may be a left-handed circular polarization (LCP) state.

The QWP may have a fast axis and a slow axis disposed at an angle of 45 degrees relative to a polarization plane of the WGP.

The QWP may be disposed between the WGP and the ChLC layer or on the front surface of the optical element block, and the QWP may be configured to convert light to a predetermined polarization state.

The QWP may be disposed between the WGP and the ChLC layer or on the back surface of the optical element block, and the QWP may be configured to convert light to a predetermined polarization state.

The optical element block may further include at least one plane-parallel plate.

Each optical element of the optical element block may be formed of an optically transparent material including one of optical glass, optical crystal, and polymer.

The WGP may have a thickness, a line period, and a line direction that correspond to a first state of linear polarization.

Each of the WGP, the QWP, and the ChLC layer may be configured to retain a polarization property that does not exceed a threshold incidence angle of light and provide a maximum incidence angle of the light.

According to another aspect of an example embodiment, there is provided an optical image capturing device including an aperture diaphragm (AD), an optical element block including a front surface facing an object on which the AD is disposed and a back surface facing an image plane, the optical element block being optically coupled with the AD, and a sensor configured to be optically coupled with the optical element block and sense the image plane, wherein the optical element block includes at least one lens element, a wire grid polarizer (WGP), a quarter wave plate (QWP), and a cholesteric liquid crystal (ChLC) layer, and wherein the WGP, the at least one lens element, the QWP, and the ChLC layer are disposed to provide a predetermined multi-transmission of light from an object side to the image plane.

The sensor may be a photodetector array.

The optical image capturing may further include a filter disposed between the optical element block and the sensor.

The filter may be formed of optical glass, and is an infrared (IR) filter configured to remove noise from a record of IR light.

According to yet another aspect of an example embodiment, there is provided an optical multi-pass imaging device including an aperture diaphragm (AD), and an optical element block including a front surface facing an object on which the AD is disposed and a back surface facing an image plane, and the optical element block being optically coupled with the AD, wherein the optical element block includes at least one lens element, a wire grid polarizer (WGP), a quarter wave plate (QWP), and a cholesteric liquid crystal (ChLC) layer, wherein the WGP is disposed in front of or directly on the front surface of the optical element block, the ChLC layer is disposed behind or directly on the back surface of the optical element block, and the QWP is disposed between the WGP and the ChLC layer, wherein the at least one lens element is configured to refract light incident at a predetermined angle, wherein the WGP is configured to transmit light of a first state of linear polarization and reflect light of a second state of linear polarization, wherein the QWP has a fast axis and a slow axis disposed at an angle of 45 degrees relative to a polarization plane of the WGP, and is configured to convert the light from the first state of linear polarization to a first state of circular polarization, convert the light from the first state of circular polarization to the second state of linear polarization, and convert the light from the second state of linear polarization to a second state of circular polarization, wherein the ChLC layer is configured to reflect the light of the first state of circular polarization and transmit the light of the second state of circular polarization, and wherein the WGP, the at least one lens element, the QWP, and the ChLC layer are disposed to provide a predetermined multi-transmission of radiation light from an object side to the image plane.

One of the first state of linear polarization and the second state of linear polarization may be a P-polarization state and the other of the first state of linear polarization and the second state of linear polarization may be an S-polarization state.

One of the first state of circular polarization and the second state of circular polarization may be a right-handed circular polarization (RCP) state and the other of the first state of circular polarization the second state of circular polarization may be a left-handed circular polarization (LCP) state.

The optical element block may further include at least one plane-parallel plate.

BRIEF DESCRIPTION OF THE DRAWINGS

The above and/or other aspects will be more apparent by describing example embodiments, taken in conjunction with the accompanying drawings, in which.

DETAILED DESCRIPTION

Figure 1:
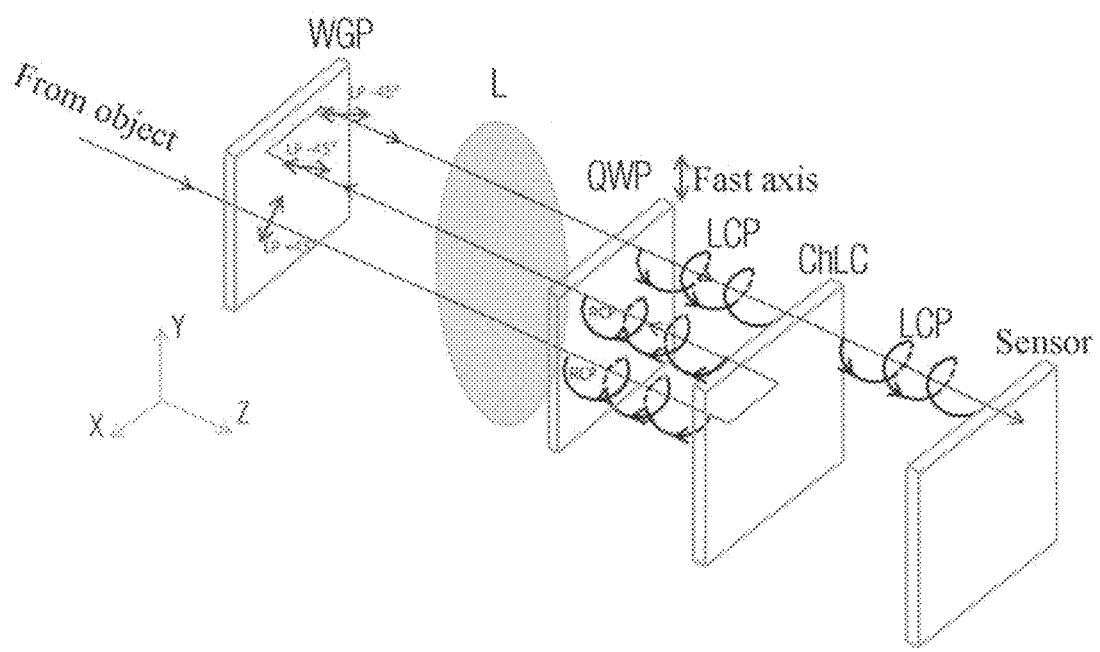
FIG. 1 illustrates an example of an optical multi-pass imaging device according to an example embodiment.

Hereinafter, example embodiments will be described in detail with reference to the accompanying drawings. Various modifications may be made to the example embodiments. Here, the example embodiments are not construed as limited to the disclosure and should be understood to include all changes, equivalents, and replacements within the idea and the technical scope of the disclosure.

The terminology used herein is for the purpose of describing example embodiments only and is not to be limiting of the example embodiments. As used herein, the singular forms "a," "an," and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined herein, all terms used herein including technical or scientific terms have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

When describing the example embodiments with reference to the accompanying drawings, like reference numerals refer to like constituent elements and a repeated description related thereto will be omitted. In the description of example embodiments, detailed description of well-known related structures or functions will be omitted when it is deemed that such description will cause ambiguous interpretation of the present disclosure.

Also, the terms "first," "second," "A," "B," "(a)," "(b)," and the like may be used herein to describe components according to example embodiments. Each of these terminologies is not used to define an essence, order or sequence of a corresponding component but used merely to distinguish the corresponding component from other component(s). It should be noted that if it is described in the specification that one component is "connected," "coupled," or "joined" to another component, a third component may be "connected," "coupled," and "joined" between the first and second components, although the first component may be directly connected, coupled or joined to the second component.

A component having a common function with a component included in one example embodiment is described using a like name in another example embodiment. Unless otherwise described, the description made in one example embodiment may be applicable to another example embodiment and detailed description within a duplicate range is omitted.

An aspect of the present disclosure provides a compact optical multi-pass imaging device based on polarization elements with a short total length (TTL) that is less than a focal length of the optical multi-pass imaging device, and an optical image capturing device that provides multi-pass radiation through a smaller number of optical elements using polarization coatings or elements in the device and provides a high-resolution image and includes the optical multi-pass imaging device including the polarization elements.

In addition, to provide a high resolution of an image formed by the optical multi-pass imaging device based on the polarization elements, an aspect of the present disclosure provides a combination of such polarization coatings or elements having a preset polarization property that allows multi-pass radiation using a small number of optical elements and minimizes a radiation signal loss and noise that may be caused by the polarization coatings. The optical multi-pass imaging device may have a reduced TTL of the optical device due to a multi-pass structure of a beam path, and thus have a reduced size of the optical multi-pass imaging device.

Hereinafter, an optical multi-pass imaging device for an electronic mobile device, which is based on polarization elements and an optical image capturing system, will be described in detail with reference to FIGS. 1 through 10.

FIGS. 1, 3A and 3B, and 4A and 4B illustrate a process of converting a polarization state by the optical multi-pass imaging device. Some elements may be omitted from FIGS. 1, 3A and 3B, and 4A and 4B.

A transmission of radiation from an object to a sensor will be described hereinafter with reference to FIG. 1.

FIG. 1 illustrates an example of an optical multi-pass imaging device according to an example embodiment.

Referring to FIG. 1, an optical element block included in an optical multi-pass imaging device includes at least one lens element (L). The optical multi-pass imaging device may also include at least one plane-parallel plate and polarization elements.

The polarization elements may include a wire grid polarizer (WGP), a quarter wave plate (QWP), and a cholesteric liquid crystal (ChLC) layer.

Referring to FIG. 1, unpolarized radiation light may be input from an object to the optical multi-pass imaging device, and then be incident on the WGP.

The WGP may be a linear polarizer that includes a plurality of thin parallel metal wires disposed on a given surface. The WGP may be configured to transmit the radiation light of a first state of linear polarization and reflect the radiation light of a second state of linear polarization, or transmit the radiation light of the second state of linear polarization or reflect the radiation light of the first state of linear polarization.

Figure 2A:
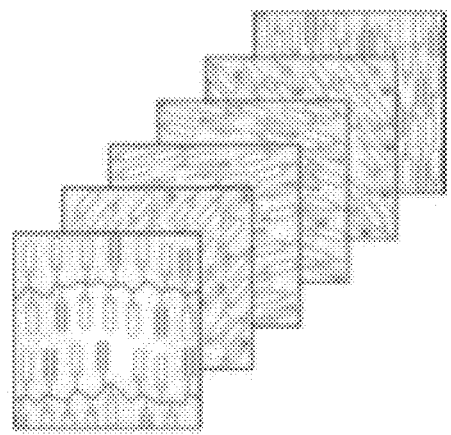
FIG. 2A illustrates an example structure of a cholesteric liquid crystal (ChLC) layer.
Figure 2B:
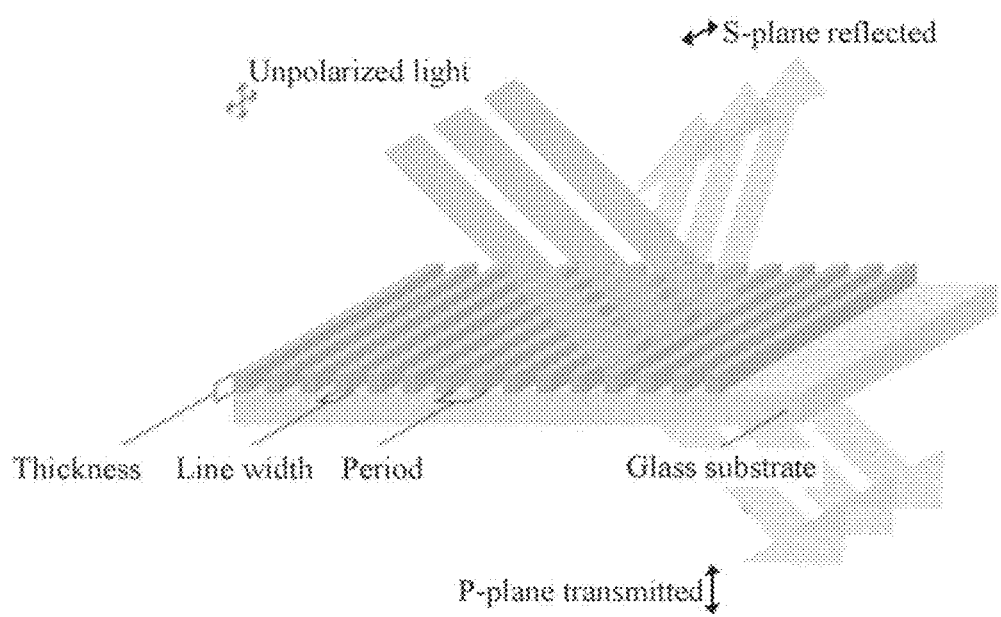
FIG. 2B illustrates an example of a wire grid polarizer (WGP)

FIG. 2B illustrates an example of a WGP that is a linear polarizer.

Referring to FIG. 2B, a set of parallel aluminum wires is arranged on a glass substrate to form a wire structure with each having a given thickness, width, and period.

In this example, radiation light of an S-polarization state (corresponding to the second state of polarization) may be reflected by the WGP, and radiation light of a P-polarization state (corresponding to the first state of polarization) may pass through the WGP.

In the WGP, the radiation light may be polarized in a predetermined way, for example, the radiation light may have a first state of polarization, for example, at an angle of 45 degrees (°).

Subsequently, the linearly polarized radiation light that has the first state of polarization may pass through the lens element L and be refracted at a predetermined angle.

The linearly polarized light may then be incident on the QWP such that a fast axis of the QWP is disposed on a polarization plane of the WGP at an angle of 45°. The fast axis may refer to an axis with a great divergence angle, and a slow axis may refer to an axis with a small divergence angle.

Figure 2C:
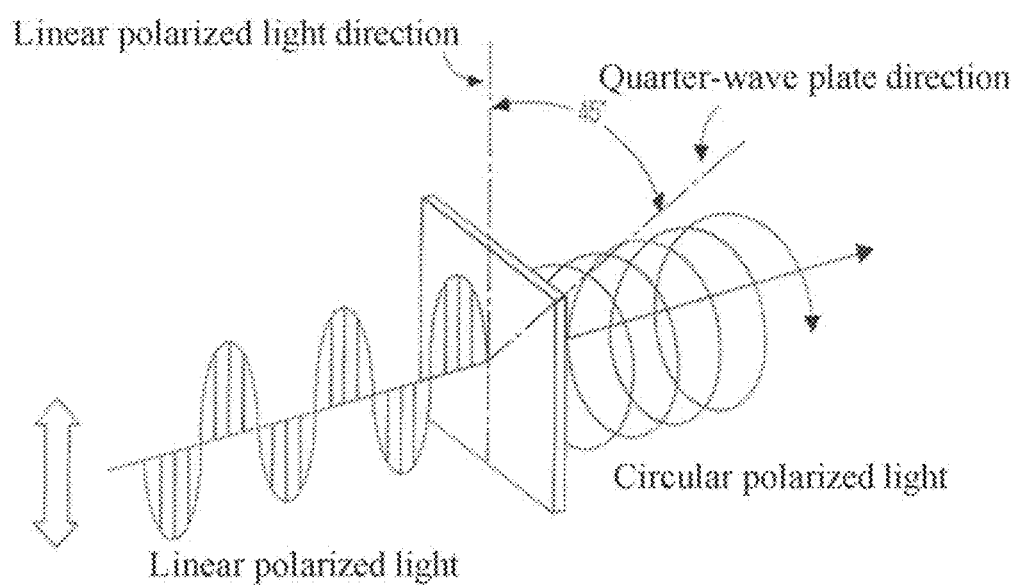
FIG. 2C illustrates an example of a conversion of radiation light passing through a quarter wave plate (QWP)

Generally, phase plates are configured to change or convert a polarization state of light passing therethrough. In such a case, a quarter wave phase plate may be configured to convert linearly polarized light to circularly polarized light, or convert circularly polarized light to linearly polarized light. An example of a conversion of radiation light passing through the QWP is illustrated in FIG. 2C. FIG. 2C illustrates an example of a conversion of radiation light passing through the QWP.

After passing through the QWP, the light may change from the first state of linear polarization to a first state of circular polarization, for example, a right-handed circular polarization (RCP) state.

The light may then be incident on the ChLC layer.

A ChLC used herein may be a liquid crystal having a helical structure, which is, chiral. The ChLC may also be a chiral nematic liquid crystal. Such a crystal may be distinguished by an arrangement in a layer without a positional order, and may selectively reflect a light component in a predetermined wavelength range due to its periodic structure, for example, a spiral molecular direction. Example embodiments may include a ChLC that provides a maximum transmission of left-handed circularly polarized light beams and a maximum reflection of right-handed circularly polarized light beams. An example of the structure of the ChLC layer is illustrated in FIG. 2A.

FIG. 2A illustrates an example structure of the ChLC layer.

The ChLC layer may be configured such that light of a first state of circular polarization, for example, an RCP state, is substantially completely reflected from the ChLC layer.

The light without a state change may be incident on the QWP again, and the light, for example, RCP radiation light, having the first state of circular polarization may be converted to light of a second state of linear polarization, optically, at an angle of −45° as illustrated in FIG. 1.

The light of the second state of linear polarization may then be incident on the lens element L, and pass therethrough for a second time.

The light may then be incident on the WGP while maintaining a polarization direction at the angle of −45°.

The further linearly polarized light may be reflected from the WGP while maintaining the second state of polarization. For example, the polarization direction may be at the angle of −45°.

The light reflected from the WGP may pass through the lens element L for a third time.

The light of the second state of polarization at the angle of −45° may then be incident on the QWP, and be converted to light of a second state of circular polarization, for example, a left-handed circular polarization (LCP) state.

The light that is an LCP light of the second state of circular polarization may be incident on the ChLC layer configured to transmit the light to a sensor.

Figure 3A:
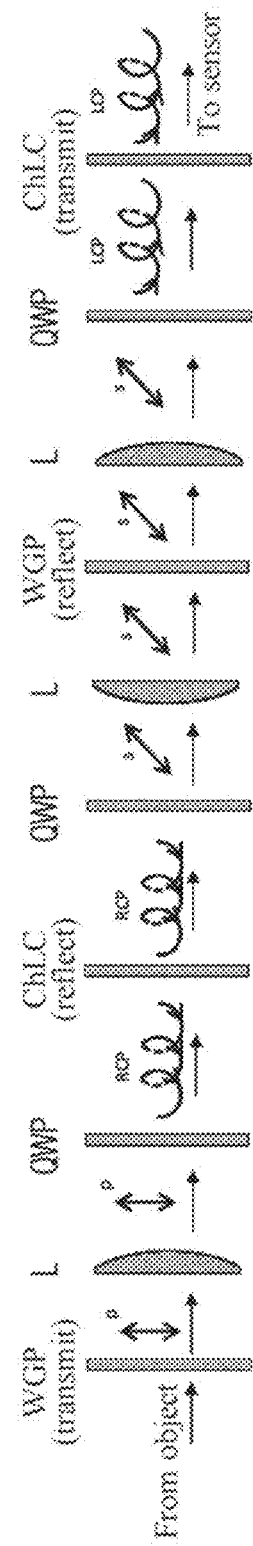
FIG. 3A illustrates a schema of light passing through an optical multi-pass imaging device according to an example embodiment.

FIG. 3A illustrates a schema of light passing through an optical multi-pass imaging device according to an example embodiment.

Unpolarized radiation light may be input from an object to the WGP at a predetermined angle. The radiation light may be transmitted in a P-polarization state corresponding to a first state of linear polarization, and the light may then pass through the lens element L and then be refracted at a predetermined angle. The light may then be incident on the QWP, while maintaining the P-polarization state, such that the fast axis of the QWP is disposed at an angle of +45° to the polarization plane of the WGP.

The light passing through the QWP may change from the P-polarization state of linear polarization to an RCP state corresponding to a first state of circular polarization, and then be incident on the ChLC layer. The ChLC layer may be configured such that the light having the RCP state is completely reflected on the QWP.

The light without a change may be incident on the QWP again, and the light of the RCP state may be converted to light of an S-polarization state corresponding to a second state of linear polarization, optionally, at an angle of −45°, and may then pass through the lens element L again for a second time after falling on the lens element L.

The light may then be incident on the WGP while maintaining a direction of the S-polarization state at the angle of −45°.

The linearly polarized light may then be reflected from the WGP while maintaining the second state of S-polarization.

The light may then pass through the lens element L for a third time.

The light may then be incident on the QWP while maintaining the S-polarization state after being reflected at a predetermined angle, and then be converted to an LCP state corresponding to the second state of circular polarization which is incident on the ChLC layer. In such a case, the light of the LCP state may be completely transmitted to a sensor.

Figure 3B:
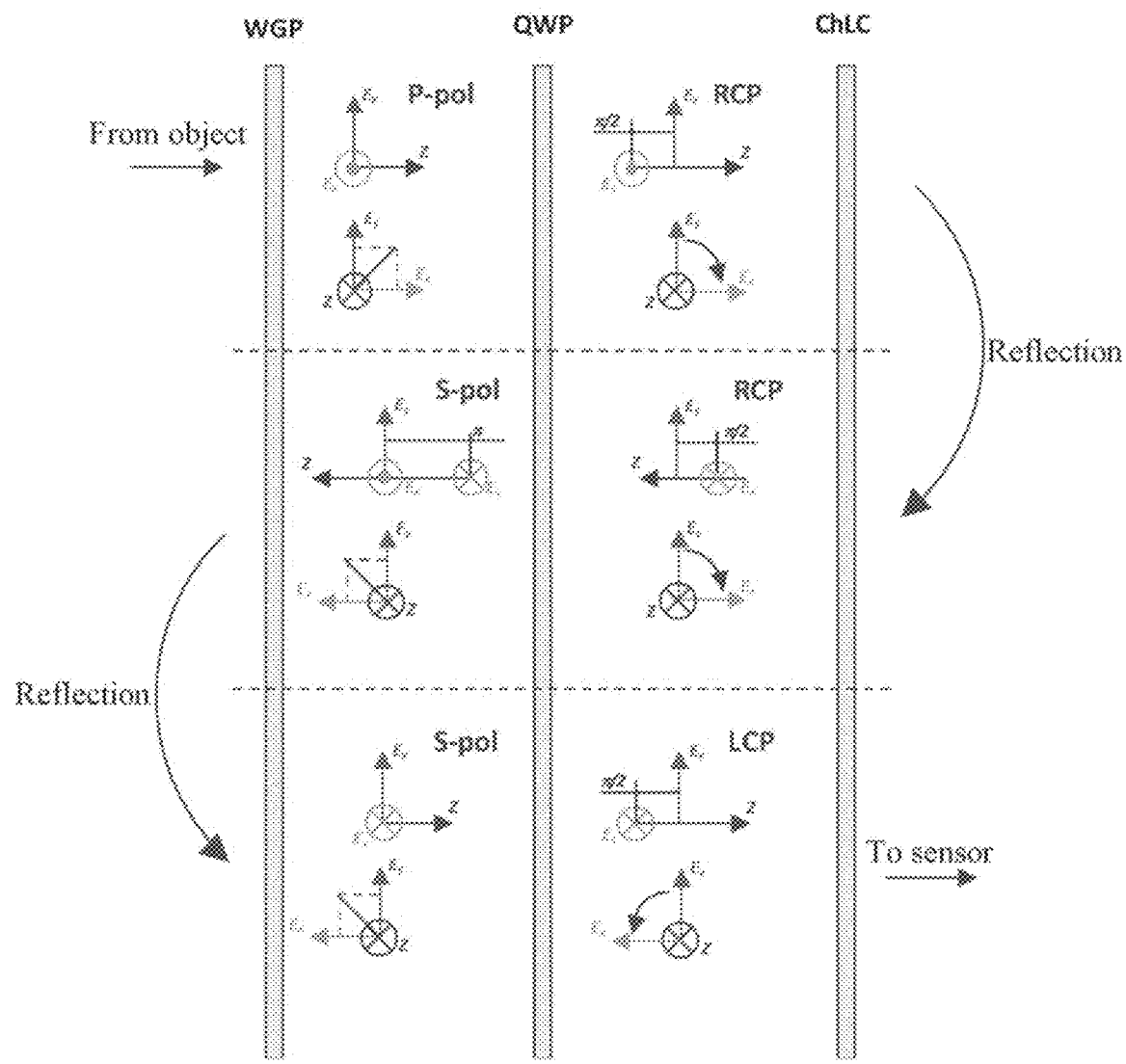
FIG. 3B illustrates a schema of a conversion of a polarization state of light passing through a WGP polarizer, a QWP, and a ChLC layer according to FIG. 3A.

FIG. 3B illustrates a schema of a conversion of a polarization state of light passing through the WGP, the QWP, and the ChLC layer according to FIG. 3A.

FIGS. 3A and 3B illustrate a polarization state conversion process when light passes through the WGP, the QWP, and the ChLC layer.

An example of a light propagation through the lens element L is described in detail with reference to FIG. 3A and is thus omitted from FIG. 3B.

In FIG. 3B, an optical multi-pass imaging device may include a WGP, a QWP, a ChLC layer, a light of a P-polarization P-pol state (P-polarized light), a light of an S-polarization S-pol state (S-polarized light), a light of a RCP state, and a light of a left-handed circular polarization LCP state.

Unpolarized light from an object may be incident on the WGP. A direction of wires that form the structure of the WGP may correspond to a P-polarization state, and the light may be converted to P-polarized light which is light of the P-polarization state.

The P-polarized light may pass through the QWP and be converted to right-handed circularly polarized RCP light which is light of the RCP state. The fast axis of the QWP may have the same direction as a direction of electrical components (Ey) of the incident P-polarized light, and may thus shift in phase by $\pi/2$.

The RCP light may be reflected from the ChLC layer while maintaining the polarization state because the ChLC layer has a right-handed spiral liquid crystal structure.

The reflected RCP light may pass through the QWP, and be converted to S-polarized light which is light of an S-polarization state as the displacement of the electrical components Ey becomes $\pi$, increasing by $\pi/2$.

The S-polarized light may be reflected from the WGP because the direction of the wires that form the polarization structure corresponds to the P-polarization state.

The S-polarized light may pass through the QWP, and be converted to left-handed circularly polarized light (LCP light) which is light of an LCP state, as the electrical components Ey additionally shift in phase by $\pi/2$.

The LCP light may pass through the ChLC layer because the ChLC layer has a right-handed spiral liquid crystal structure and is directed toward a sensor.

Figure 4A:
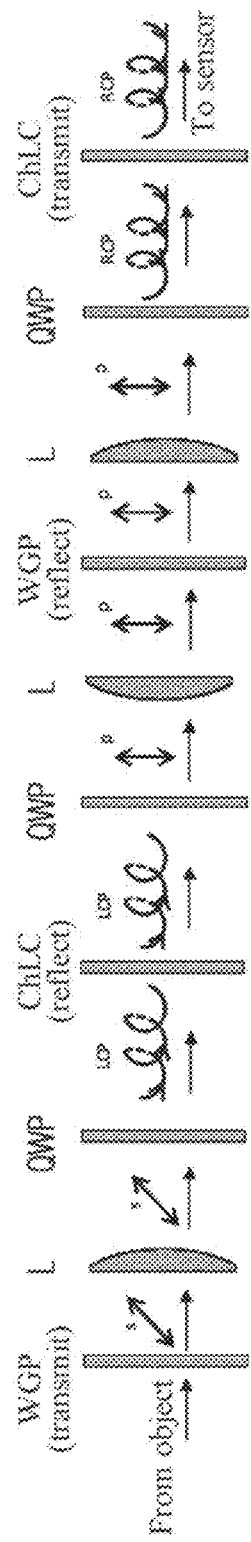
FIG. 4A illustrates a schema of light passing through an optical multi-pass imaging device according to another example embodiment.

FIG. 4A illustrates a schema of light passing through an optical multi-pass imaging device according to another example embodiment.

Unpolarized light may be input from an object to the WGP at a predetermined angle, and be transmitted in an S-polarization state corresponding to a second state of linear polarization. The light may then be refracted at a predetermined angle after passing through the lens element L, and be incident on the QWP such that the fast axis of the QWP is disposed at an angle of −45° to the polarization plane of the WGP, while maintaining the S-polarization state.

The light passing through the QWP may change from the S state of linear polarization to an LCP state corresponding to a second state of circular polarization, and then fall on the ChLC layer. The ChLC layer may be configured such that the light having the LCP state is completely reflected on the QWP.

The light without a change may be incident on the QWP again. The light of the LCP state may be converted to light of a P-polarization state corresponding to a first state of linear polarization, optionally, at an angle of +45°, and may then pass through the lens element L for a second time after being incident on the lens element L again.

The light may then be incident on the WGP while maintaining a direction of the P-polarization state at the angle of +45°.

The linearly polarized light may then be reflected from the WGP while maintaining the first state of P-polarization.

The linearly polarized light may pass through the lens element L for a third time.

The light may then be incident on the QWP while maintaining the P-polarization state after being refracted at a predetermined angle, and be converted to light of an RCP state corresponding to a first state of circular polarization to fall on the ChLC layer. The ChLC layer may be configured to completely transmit the light of the RCP state to a sensor.

The WGP, the QWP, and the ChLC layer, which are optical elements included in an optical element block, may be configured to retain their polarization properties that do not exceed a threshold incidence angle $\alpha_{threshold}$ of radiation light, and provide a maximum incidence angle $\alpha_{incidence}$ of the radiation light for each optical element.

Each polarization element may have its own limitation of the range of incidence angles of light in which its polarization property is retained.

The WGP may maintain its effectiveness in a range of incidence angles <~20.0°.

The QWP may maintain its effectiveness in a range of incidence angles <~10.0°.

The ChLC layer may maintain its effectiveness in a range of incidence angles <~45.0°.

According to an implementation of each polarization element, an incidence angle for each polarization element may differ from the values indicated above.

The set of the optical elements may need to be configured such that light is incident on a polarization element at an angle less than a specified incidence angle, as represented by Equation 1.

$$\alpha_{incidence} \leq \alpha_{threshold} \qquad [\text{Equation 1}]$$

In Equation 1, an incidence angle $\alpha_{incidence}$ denotes a maximum incidence angle of light at a polarization element, and a threshold $\alpha_{threshold}$ denotes a threshold incidence value of the polarization element at which the polarization element retains its polarization property.

The following values of the threshold incidence angle of radiation light for each polarization element used in the device have been verified through experimental studies.

For the WGP, the threshold incidence angle $\alpha_{threshold}$ of radiation light is 20°.

For the QWP, the threshold incidence angle $\alpha_{threshold}$ of radiation light is 10°.

For the ChLC layer, the threshold incidence angle $\alpha_{threshold}$ of radiation light is 45°.

In such a case, the polarization elements may maintain their high efficiency, minimizing the amount of scattered radiation and noise in the optical system.

Figure 4B:
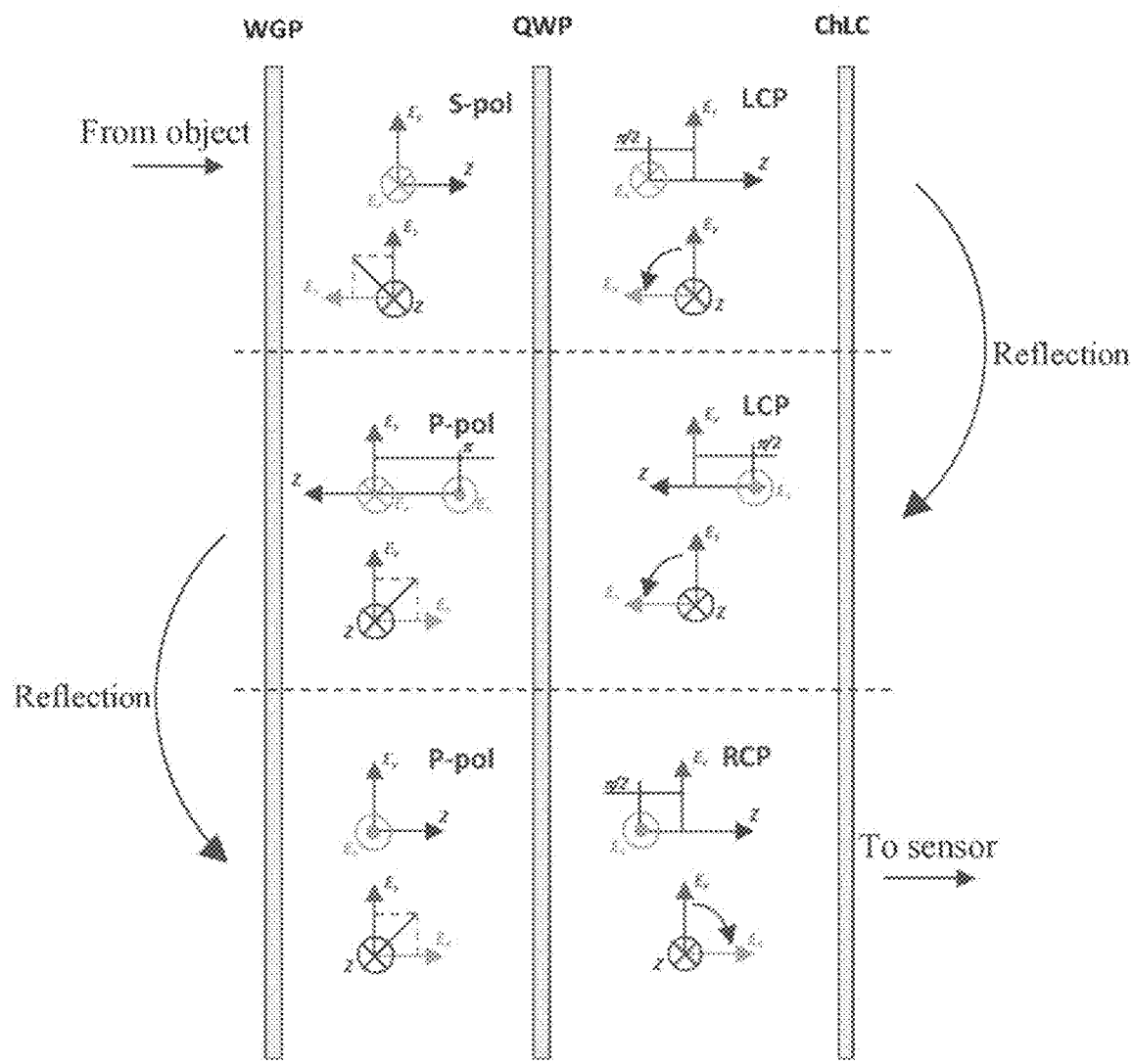
FIG. 4B illustrates a schema of a conversion of a polarization state of light passing through a WGP polarizer, a QWP, and a ChLC layer according to FIG. 4A.

FIG. 4B illustrates a schema of a conversion of a polarization state of light passing through the WGP polarizer, the QWP, and the ChLC layer according to FIG. 4A.

A passage of light through a plurality of optical elements L is described above with reference to FIG. 4A, and omitted in FIG. 4B.

In FIG. 4B, an optical multi-pass imaging device may include a WGP, a QWP, a ChLC, a light of a P-polarization P-pol state (P-polarized light), a light of an S-polarization S-pol state (S-polarized light), a light of a right-handed circular polarization RCP state (right-handed circularly polarized light), and a light of a left-handed circular polarization LCP state (left-handed circularly polarized light).

Unpolarized light from an object may fall on the WGP. A direction of wires that form the structure of the WGP may correspond to an S-polarization state, and the light may be converted to S-polarized light which is light of the S-polarization state.

The S-polarized light may pass through the QWP and be converted to left-handed circularly polarized light (LCP light) which is light of an LCP state. The fast axis of the QWP may have the same direction as a direction of electrical components (Ey) of the incident S-polarized light, and thus may shift in phase by $\pi/2$.

The LCP light may be reflected from the ChLC layer while maintaining the polarization state because the ChLC layer has a left-handed spiral liquid crystal structure.

The reflected LCP light may pass through the QWP, and be converted to P-polarized light which is the light of the P-polarization state as the displacement of the electrical components Ey becomes $\pi$, increasing by $\pi/2$.

The P-polarized light may be reflected from the WGP because the direction of the wires that form the polarization structure corresponds to the S-polarization state.

The P-polarized light may pass through the QWP, and be converted to right-handed circularly polarized light (RCP light) which is light of an RCP state as the electrical components Ey additionally shift in phase by $\pi/2$.

The RCP light may pass through the ChLC layer because the ChLC layer has a left-handed spiral liquid crystal structure and is directed toward a sensor.

The following are detailed examples of the implementation of an optical multi-pass imaging device and an image capturing device according to example embodiments.

However, as already described above, any example embodiment described herein may not be necessarily construed as preferred or advantageous over other example embodiments described in the specification and claims.

Figure 5:
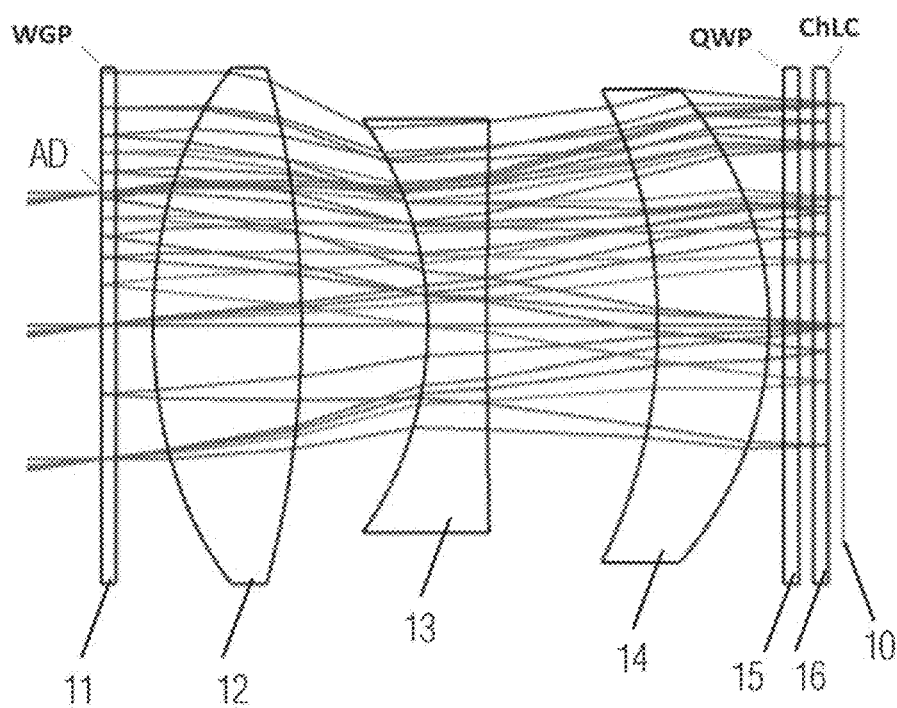
FIG. 5 illustrates an optical multi-pass imaging device according to an example embodiment.

FIG. 5 illustrates an optical multi-pass imaging device according to an example embodiment.

Referring to FIG. 5, there are provided an optical multi-pass imaging device based on polarization elements, and an optical image capturing device including the optical multi-pass imaging device and a sensor 10.

According to FIG. 5, the optical multi-pass imaging device may include an aperture diaphragm (AD) and six optical elements that are optically coupled and sequentially disposed along an optical axis of the optical multi-pass imaging device based on polarization elements from an object side to an image plane. The six optical elements may include a first optical element 11, a second optical element 12, a third optical element 13, a fourth optical element 14, a fifth optical element 15, and a sixth optical element 16, which are arranged in sequential order along the optical axis of the optical multi-pass imaging device based on the polarization elements from an object side to the image plane. The image plane may correspond to the sensor 10.

The first optical element 11 may be a plane-parallel plate with both surfaces thereof being flat.

The second optical element 12 may be a lens having positive refractive power. In such a case, an object-side surface of the lens may be convex, and an image-side surface of the lens may also be convex.

The third optical element 13 may be a lens having negative refractive power. In such a case, an object-side surface of the lens may be concave, and an image-side surface of the lens may also be concave.

The fourth optical element 14 may be a lens having positive refractive power. In such a case, an object-side surface of the lens may be concave, and an image-side surface of the lens may be convex.

The fifth optical element 15 may be a plane-parallel plate with both surfaces thereof being flat.

The sixth optical element 16 may be a plane-parallel plate with both surfaces thereof being flat.

Each of the optical elements 11, 12, 13, 14, 15, and 16 may be lenses that are formed of optical plastic or optical glass.

Figure 6:
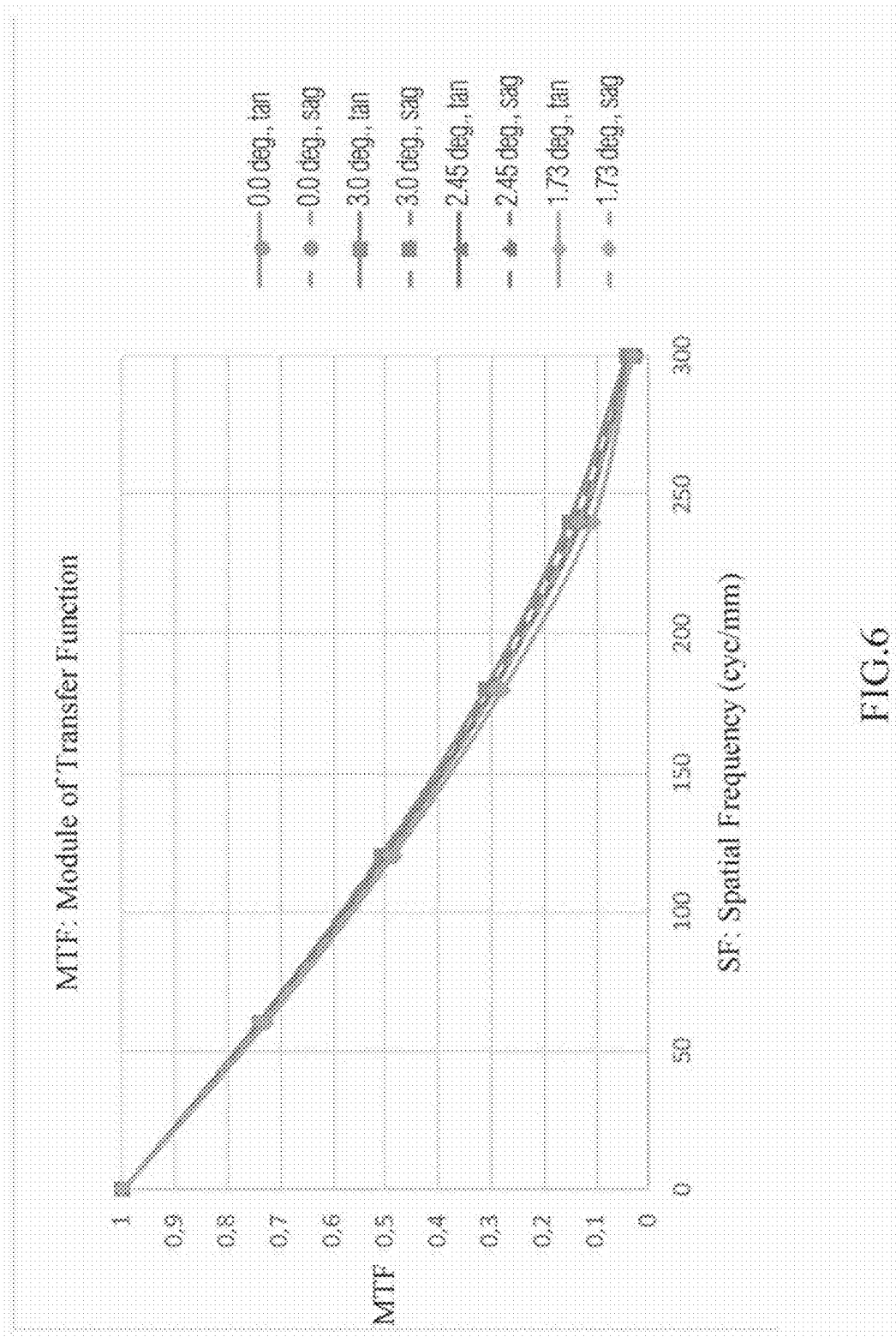
FIG. 6 illustrates a graph indicating a frequency-contrast characteristic with respect to different field points of the optical multi-pass imaging device according in FIG. 5.

FIG. 6 illustrates a graph indicating a frequency-contrast characteristic with respect to different field points of the optical multi-pass imaging device according to FIG. 5.

FIG. 6 illustrates a graph indicating a frequency-contrast characteristic of the optical multi-pass imaging device based on polarization coatings according to FIG. 5 with respect to various field points (0.0°; 3.0°; 2.45°; 1.73°) depending on a spatial frequency (SF). For example, the graph may show with what contrast the different frequencies are resolved. In FIG. 6, a maximum frequency is 300 lines/mm. In the graph, at a frequency of 200 lines/mm, the contrast (or a module of transfer function (MTF)) exceeds the value of 0.2 for all the field points.

In the graph, an abscissa axis (or a horizontal axis) indicates a spatial frequency in lines/mm, and an ordinate axis (or a vertical axis) indicates a module of an optical transfer function (OTF), that is MTF, the contrast of an image.

Curves shown in FIG. 6 indicate MTF for the different field points (0.0°; 3.0°; 2.45°; 1.73°) for two sections— tangential (YZ) and sagittal (XZ).

As described above, a multi-transmission of radiation light through the optical multi-pass imaging device may be provided by disposing a polarization element on a certain optical element. The polarization element and the optical element may form an optical element block.

Referring to FIG. 5, in the optical multi-pass imaging device based on the polarization elements according to the example embodiment, the WGP may be applied to a front surface of an optical element block which is the surface of the first optical element 11 facing an object, as a form of coatings applied to a certain optical element. The QWP may be applied to the flat surface of the fifth optical element 15 facing the object. The ChLC layer may be applied to the flat surface (or a back surface) of the sixth optical element 16 facing the image, which is a back surface of the optical element block.

The optical multi-pass imaging device according to the example embodiment illustrated in FIG. 5 may also include the AD disposed on the first optical element 11 on the object side.

All the elements of the optical multi-pass imaging device may be optically coupled with each other and configured to form the image on a working surface of the sensor 10.

The sensor 10 may be a photodetector array configured to detect electromagnetic radiation, for example, in a range of 0.48 µm to 0.66 µm, and a sensor pixel size thereof may be 2.5 µm.

In addition, the optical image capturing device according to the example embodiment illustrated in FIG. 5 may optionally include a filter such as an infrared (IR) filter disposed between the optical multi-pass imaging device and the sensor 10.

The IR filter may be formed of optical glass, and be configured to remove noise from the registration of IR radiation.

Table 1 below indicates design parameters of the optical multi-pass imaging device, including parameters including F-number (Fno)=5.5, Focal length (F') of the device=20.0 mm, Half the maximum field of view (HFOV)=3.0°, Axial direction between the object-side surface of the first optical element 11 and the image plane, that is, a total length (TTL) of the optical multi-pass imaging device=11.0 mm, and $\Delta\lambda=(F-d-C)$: a spectral range between 0.4861 µm-0.6563 µm for the optical multi-pass imaging device.

TABLE 1

F' = 20.0 mm, Fno = 5.5, HFOV = 3.0 degrees, TTL = 11.0 mm, $\Delta\lambda$ = F-d-C

| | Radius | Axial thickness | Nd; Abbe number | Max. half-diameter | Conic. constant |
|---|---|---|---|---|---|
| 1-AD | infinity | 0.20 | 1.52; 64.2 | 3.50 | 0.00 |
| 2 | infinity | 0.50 | | 3.50 | 0.00 |
| 3 | 7.0929 | 2.00 | 1.43; 95.2 | 3.50 | 1.51 |
| 4 | −13.1439 | 1.70 | | 3.50 | 0.00 |
| 5 | −4.9120 | 0.80 | 1.73; 51.8 | 2.80 | 0.00 |
| 6 | 150.3131 | 2.30 | | 2.80 | 0.00 |
| 7 | −7.1705 | 1.50 | 1.62; 63.5 | 3.20 | 0.00 |
| 8 | −4.6589 | 0.20 | | 3.20 | −0.36 |
| 9 | infinity | 0.20 | 1.52; 64.2 | 3.10 | 0.00 |
| 10 | infinity | 0.20 | | 3.10 | 0.00 |
| 11 | infinity | 0.20 | 1.52; 64.2 | 3.10 | 0.00 |
| 12 | infinity | 0.20 | | 3.10 | 0.00 |
| 13-SENSOR | infinity | — | — | 3.00 | — |

In Table 1 above, radius, axial thickness, and maximum half-diameter are indicated in mm.

The numbering of the surfaces from 1 to 13 in Table 1 indicates the surfaces in order from the object to the image. In such a case, according to example embodiment as illustrated in FIG. 5, the AD may be disposed on surface 1 of the first optical element 11, and surfaces 1 and 2 may indicate the first optical element 11, as indicated in Table 1 above. In addition, surfaces 3 and 4 may indicate the second optical element 12. In such a case, surface 13 may indicate the sensor 10 on which the image is formed.

The indicated design parameters of the optical multi-pass imaging device and the image capturing device according to example embodiment as illustrated in FIG. 5 may provide a high image resolution, as the contrast (MTF) for all the field points exceeds 0.2 at a spatial frequency of 200 lines/mm, the sensor pixel size d is 2.5 µm (d=2.5 µm), the TTL is 11.0 mm (TTL=11.0 mm), and the F-number of the optical multi-pass imaging device is 5.5. In this case, a maximum incidence angle ($\alpha_{incidence}$) of light on the WGP may be 3.05°, a maximum incidence angle ($\alpha_{incidence}$) of light on the QWP may be 3.60°, and a maximum incidence angle ($\alpha_{incidence}$) of light on the ChLC layer may be 3.60°.

Figure 7A:
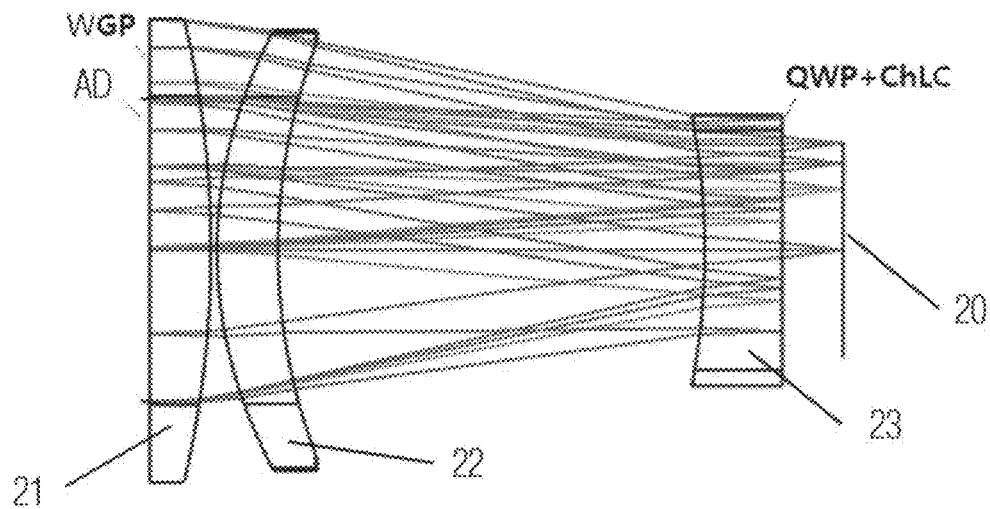
FIG. 7A illustrates an optical multi-pass imaging device according to another example embodiment.

FIG. 7A illustrates an optical multi-pass imaging device according to another example embodiment.

Referring to FIG. 7A, there are provided an optical multi-pass imaging device based on polarization elements provided in the form of polarization coatings, and an optical image capturing device including the optical multi-pass imaging device and a sensor 20.

The optical multi-pass imaging device according to the example embodiment as illustrated in FIG. 7 may include an AD, a first optical element 21, a second optical element 22, and a third optical element 23, which are optically coupled and sequentially disposed along an optical axis of the optical multi-pass imaging device from an object side to an image plane. The image plane may correspond to a sensitive surface of the sensor 20.

The optical elements described above, and the WGP, the QWP, and the ChLC layer may form an optical element block having a front surface facing an object on which the AD is provided and a back surface facing the image plane.

In such a case, the first optical element 21 may be a lens having positive refractive power. An object-side surface of the lens may be flat, and an image-side surface of the lens may be convex.

The second optical element 22 may be a lens having positive refractive power. An object-side surface of the lens may be convex, and an image-side surface of the lens may be concave.

The third optical element 23 may be a lens having negative refractive power. An object-side surface of the lens may be concave, and an image-side surface of the lens may be flat.

In the optical multi-pass imaging device based on polarization coatings according to the example embodiment as illustrated in FIG. 7A, the WGP may be applied onto the front surface of the optical element block which is the object-side surface of the first optical element 21 facing the object.

The QWP and the ChLC layer may be sequentially applied onto the surface of the third optical element 23 facing the image.

The optical multi-pass imaging device according to the example embodiment as illustrated in FIG. 7A may also include the AD disposed on the flat surface of the first optical element 21 on the object side. All the elements of the optical multi-pass imaging device may be optically coupled with each other with the possibility of forming the image on a working surface of the sensor 20.

In this case, the sensor 20 may be a photodetector array configured to detect electromagnetic radiation in a range of 0.48 μm to 0.66 μm, and a sensor pixel size thereof may be 2.0 μm.

In addition, the optical image capturing device according to the example embodiment as illustrated in FIG. 7A may optionally include a filter such as an IR filter disposed between the optical multi-pass imaging device and the sensor 20.

The IR filter may be formed of optical glass, and configured to remove noise from the registration of IR radiation.

Figure 7B:
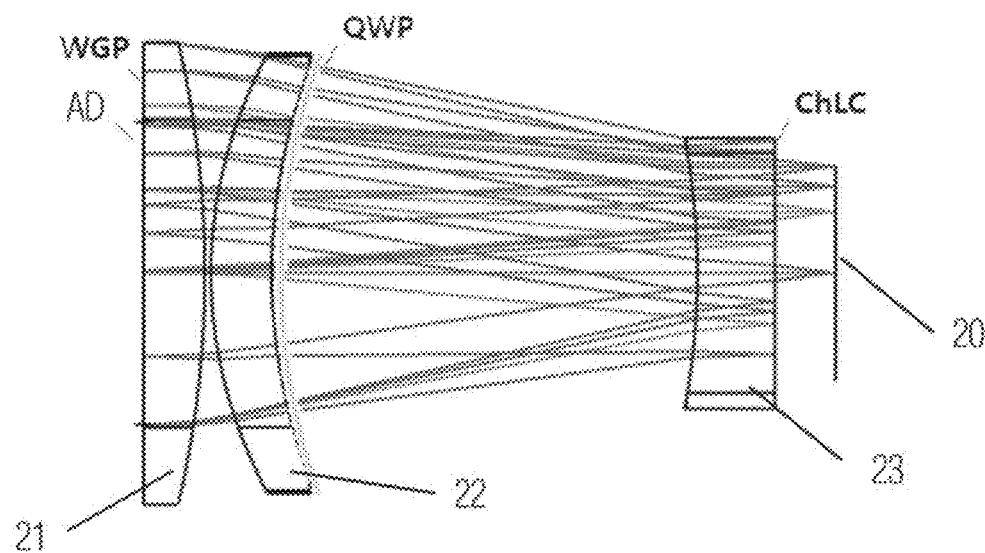
FIG. 7B illustrates an optical multi-pass imaging device according to another example embodiment.
Figure 7C:
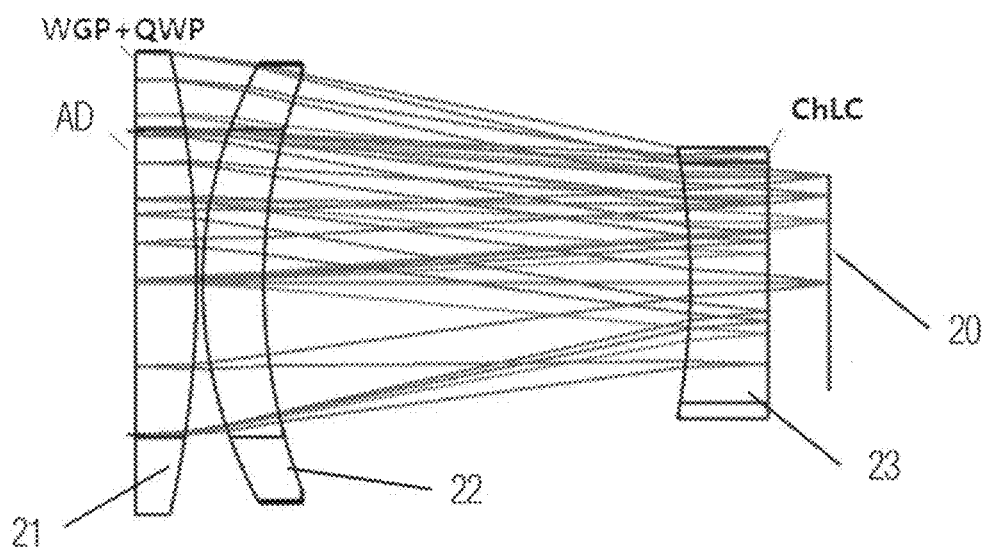
FIG. 7C illustrates an optical multi-pass imaging device according to another example embodiment.
Figure 8:
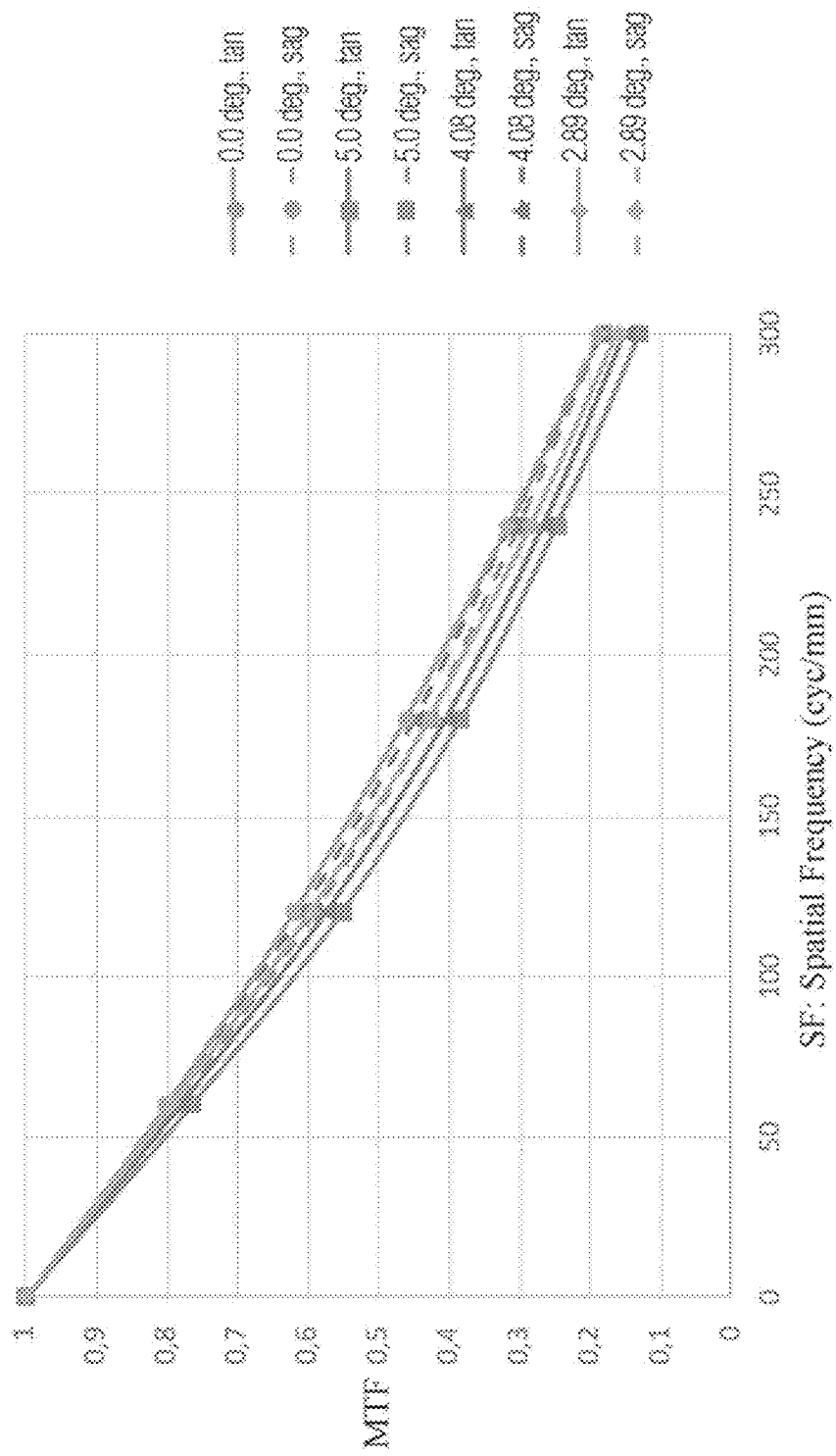
FIG. 8 illustrates a graph indicating a frequency-contrast characteristic with respect to different field points of the optical multi-pass imaging devices in FIGS. 7A, 7, and 7C.

FIG. 8 illustrates a graph indicating a frequency-contrast characteristic with respect to different field points of the optical multi-pass imaging devices according to the example embodiment as illustrated in FIGS. 7A and 7C.

FIG. 8 illustrates a graph indicating a frequency-contrast characteristic of the optical multi-pass imaging device based on polarization coatings according to the example embodiment as illustrated in FIG. 7A with respect to various field points (0.0°; 5.0°; 4.08°; 2.89°) depending on a spatial frequency (SF). For example, the graph may show with what contrast the different frequencies are resolved.

In FIG. 8, a maximum frequency is 300 lines/mm. In the graph, at a frequency of 250 lines/mm, the contrast (MTF) exceeds the value of 0.2 for all the field points.

In the graph, an abscissa axis (or a horizontal axis) indicates a spatial frequency in lines/mm, and an ordinate axis (or a vertical axis) indicates a module of an OTF, that is MTF, indicating the contrast of the image.

Curves shown in FIG. 8 indicate the MTF for the different field points (0.0°; 5.0°; 4.08°; 2.89°) for two sections—tangential (YZ) and sagittal (XZ).

Table 2 below indicates design parameters of the optical multi-pass imaging device, including the following parameters: F-number (Fno)=4.0, Focal length (F') of the device=20.0 mm, Half the maximum field of view (HFOV) =5.0°, Axial direction between the object-side surface of the first optical element 21 and the image plane, e.g., a TTL of the optical multi-pass imaging device=11.37 mm, and Δλ= (F–d–C): a spectral range between 0.4861 μm-0.6563 μm for the optical multi-pass imaging device.

TABLE 2

F' = 20.0 mm, Fno = 4.0, HFOV = 5.0 degrees, TTL = 11.37 mm, Δλ = F-d-C

| | Radius | Axial thickness | Nd; Abbe number | Max. half-diameter | Conic. constant |
|---|---|---|---|---|---|
| 1-AD | infinity | 1.00 | 1.59; 61.2 | 3.90 | 0.00 |
| 2 | −16.8600 | 0.10 | | 3.90 | 0.00 |
| 3 | 7.2836 | 1.00 | 1.52; 55.8 | 3.70 | −0.59 |
| 4 | 9.2363 | 7.00 | | 3.70 | −1.09 |
| 5 | −11.8711 | 1.27 | 1.64; 22.4 | 2.20 | 0.00 |
| 6 | infinity | −1.27 | | 2.20 | 0.00 |
| 7-SENSOR | infinity | — | — | 1.77 | — |

In Table 2 above, radius, axial thickness, and maximum half-diameter are indicated in mm.

The numbering of the surfaces from 1 to 7 in Table 2 indicates the surfaces in order from the object to the image. In such a case, according to the example embodiment as illustrated in FIG. 7A, the AD may be disposed on surface 1 of the first optical element 21, and surfaces 1 and 2 may indicate the first optical element 21, as indicated in Table 2 above. In addition, surfaces 3 and 4 may indicate the second optical element 22. In such a case, surface 7 may indicate the sensor 20 on which the image is formed.

The indicated design parameters of the optical multi-pass imaging device and the image capturing device according to the example embodiment as illustrated in FIG. 7A may provide a high image resolution, as the contrast (MTF) for all the field points exceeds 0.2 at a spatial frequency of 250 lines/mm, the sensor pixel size d is 2.5 μm (d=2.5 μm), the TTL is 11.37 mm (TTL=11.37 mm), and the F-number of the optical multi-pass imaging device is 4.0. In this case, a maximum incidence angle ($\alpha_{incidence}$) of light on the WGP may be 5.00°, a maximum incidence angle ($\alpha_{incidence}$) of light on the QWP may be 4.55°, and a maximum incidence angle ($\alpha_{incidence}$) of light on the ChLC layer may be 4.55°.

FIG. 7B illustrates an optical multi-pass imaging device according to another example embodiment.

Referring to FIG. 7B, there are provided an optical multi-pass imaging device based on polarization coatings, and an optical image capturing device including the optical multi-pass imaging device and a sensor 20.

The optical multi-pass imaging device according to the example embodiment as illustrated in FIG. 7B may be the same in the structure as the optical multi-pass imaging device according to the example embodiment as illustrated in FIG. 7A, except for elements provided with polarization coatings.

The optical multi-pass imaging device according to the example embodiment as illustrated in FIG. 7B may include an AD, a first optical element 21, a second optical element 22, and a third optical element 23, which are optically coupled and sequentially disposed along an optical axis of the optical multi-pass imaging device from an object side to an image plane.

The optical elements described above, and the WGP, the QWP, and the ChLC layer may form an optical element block having a front surface facing an object on which the AD is provided and a back surface facing the image plane.

In such a case, the first optical element 21 may be a lens having positive refractive power. An object-side surface of the lens may be flat, and an image-side surface of the lens may be convex.

The second optical element 22 may be a lens having positive refractive power. An object-side surface of the lens may be convex, and an image-side surface of the lens may be concave.

The third optical element 23 may be a lens having negative refractive power. An object-side surface of the lens may be concave, and an image-side surface of the lens may be flat.

In the optical multi-pass imaging device based on polarization coatings according to the example embodiment as illustrated in FIG. 7B, the WGP may be applied onto the front surface of the optical element block which is the surface of the first optical element 21 facing the object.

The QWP may be applied onto the concave surface of the second optical element 22 facing the image.

The ChLC layer may be applied onto the flat surface of the third optical element 23 facing the image.

All the design parameters of the optical multi-pass imaging device according to the example embodiment as illustrated in FIG. 7A as shown in Table 2 and the graph and description in FIG. 8, may be the same as the parameters of the optical multi-pass imaging device of the example embodiment as illustrated in FIG. 7B, and thus a repeated description will be omitted.

The indicated design parameters of the optical multi-pass imaging device and the image capturing device according to the example embodiment as illustrated in FIG. 7B may provide a high image resolution, as the contrast (MTF) for all the field points exceeds 0.2 at a spatial frequency of 250 lines/mm, the sensor pixel size d is 2.0 μm (d=2.0 μm), the TTL is 11.37 mm (TTL=11.37 mm), and the F-number of the optical multi-pass imaging device is 4.0. In this case, a maximum incidence angle ($α_{incidence}$) of light on the WGP may be 5.00°, a maximum incidence angle ($α_{incidence}$) of light on the QWP may be 5.20°, and a maximum incidence angle (αincidence) of light on the ChLC layer may be 4.55°.

FIG. 7C illustrates an optical multi-pass imaging device according to another example embodiment.

Referring to FIG. 7C, there are provided an optical multi-pass imaging device based on polarization elements provided in the form of coatings, and an optical image capturing device including the optical multi-pass imaging device and a sensor 20.

The optical multi-pass imaging device according to the example embodiment as illustrated in FIG. 7C may be the same in the structure as the optical multi-pass imaging device according to the example embodiment as illustrated in FIG. 7A, except for elements provided with polarization coatings.

The optical multi-pass imaging device according to the example embodiment as illustrated in FIG. 7C may include an AD, a first optical element 21, a second optical element 22, and a third optical element 23, which are optically coupled and sequentially disposed along an optical axis of the optical multi-pass imaging device from an object side to an image plane.

The optical elements described above, and the WGP, the QWP, and the ChLC layer may form an optical element block having a front surface facing an object on which the AD is provided and having a back surface facing the image plane.

In such a case, the first optical element 21 may be a lens having positive refractive power. An object-side surface of the lens may be flat, and an image-side surface of the lens may be convex.

The second optical element 22 may be a lens having positive refractive power. An object-side surface of the lens may be convex, and an image-side surface of the lens may be concave.

The third optical element 23 may be a lens having negative refractive power. An object-side surface of the lens may be concave, and an image-side surface of the lens may be flat.

In the optical multi-pass imaging device based on polarization coatings according to the example embodiment as illustrated in FIG. 7C, the WGP and the QWP may be sequentially applied onto the surface of the first optical element 21 facing the object. The ChLC layer may be applied onto the flat surface of the third optical element 23 facing the image.

All the design parameters of the optical multi-pass imaging device according to the example embodiment as illustrated in FIG. 7A as shown in Table 2 and the graph and description in FIG. 8 may be the same as the parameters of the optical multi-pass imaging device described here, and thus a repeated description will be omitted.

The indicated design parameters of the optical multi-pass imaging device and the image capturing device according to the example embodiment as illustrated in FIG. 7C may provide a high image resolution, as the contrast (MTF) for all the field points exceeds 0.2 at a spatial frequency of 250 lines/mm, the sensor pixel size d is 2.0 μm (d=2.0 μm), the TTL is 11.37 mm (TTL=11.37 mm), and the F-number of the optical multi-pass imaging device is 4.0. In this case, a maximum incidence angle ($α_{incidence}$) of light on the WGP may be 5.00°, a maximum incidence angle ($α_{incidence}$) of light on the QWP may be 4.55°, and a maximum incidence angle ($α_{incidence}$) of light on the ChLC layer may be 4.55°.

Figure 9A:
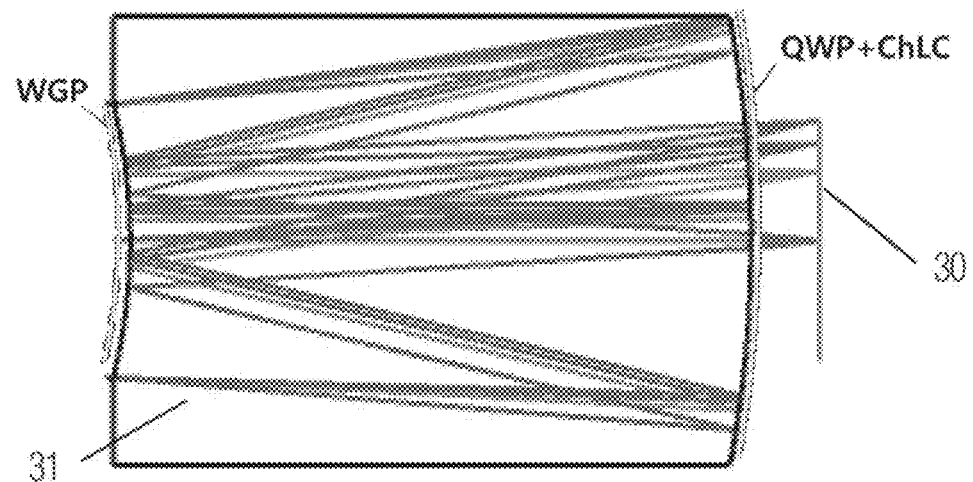
FIG. 9A illustrates an optical multi-pass imaging device according to another example embodiment.

FIG. 9A illustrates an optical multi-pass imaging device according to another example embodiment.

Referring to FIG. 9A, there are provided an optical multi-pass imaging device based on polarization elements provided in the form of polarization coatings, and an optical image capturing device including the optical multi-pass imaging device and a sensor 30.

The optical multi-pass imaging device according to the example embodiment as illustrated in FIG. 9A may include an optically coupled AD and one optical element 31 which is a lens having negative refractive power. An object-side surface of the lens may be concave, and an image-side surface of the lens may be convex.

In such a case, the coupled AD may be disposed on a front surface of the optical element 31.

The optical element 31, the WGP, the QWP, and the ChLC layer may form an optical element block having a front surface facing an object on which the AD is disposed and having a back surface facing an image plane.

In the optical multi-pass imaging device based on polarization coatings according to the example embodiment as illustrated in FIG. 9A, the WGP may be applied onto the front surface of the optical element block which is the surface of the optical element 31 facing the object.

The QWP and the ChLC layer may be sequentially applied onto the convex surface of the optical element 31 facing the image.

The AD and the optical element 31 may be optically coupled with each other to form the image on a working surface of the sensor 30.

In such a case, the sensor 30 may be a photodetector array configured to detect electromagnetic radiation in a range of 0.48-0.66 µm, and a sensor pixel size thereof may be 2.8 µm.

In addition, the optical imaging capturing device according to the example embodiment as illustrated in FIG. 9A may optionally further include a filter such as an IR filter disposed between the optical multi-pass imaging device and the sensor 30. The IR filter may be formed of optical glass and configured to remove noise from the registration of IR radiation.

Figure 9B:
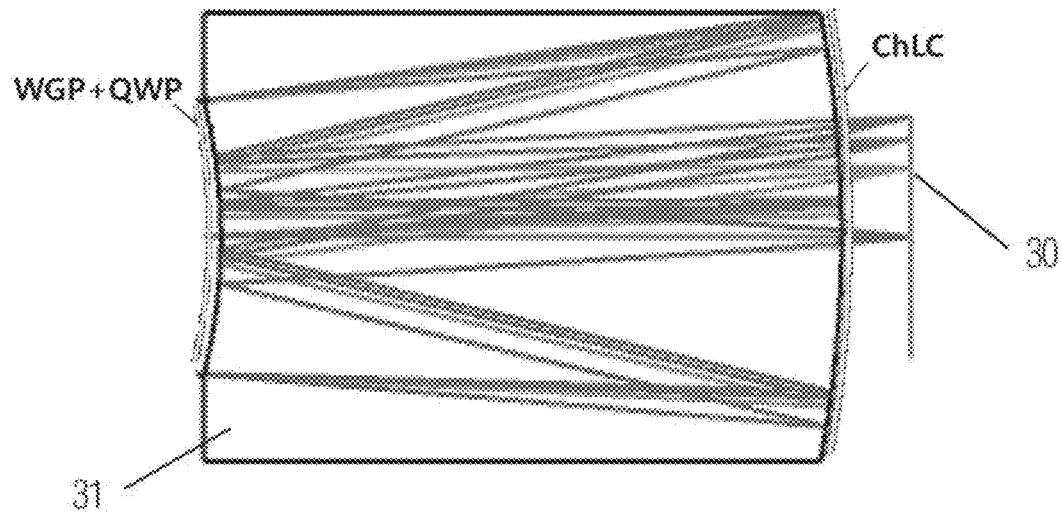
FIG. 9B illustrates an optical multi-pass imaging device according to an example embodiment.
Figure 10:
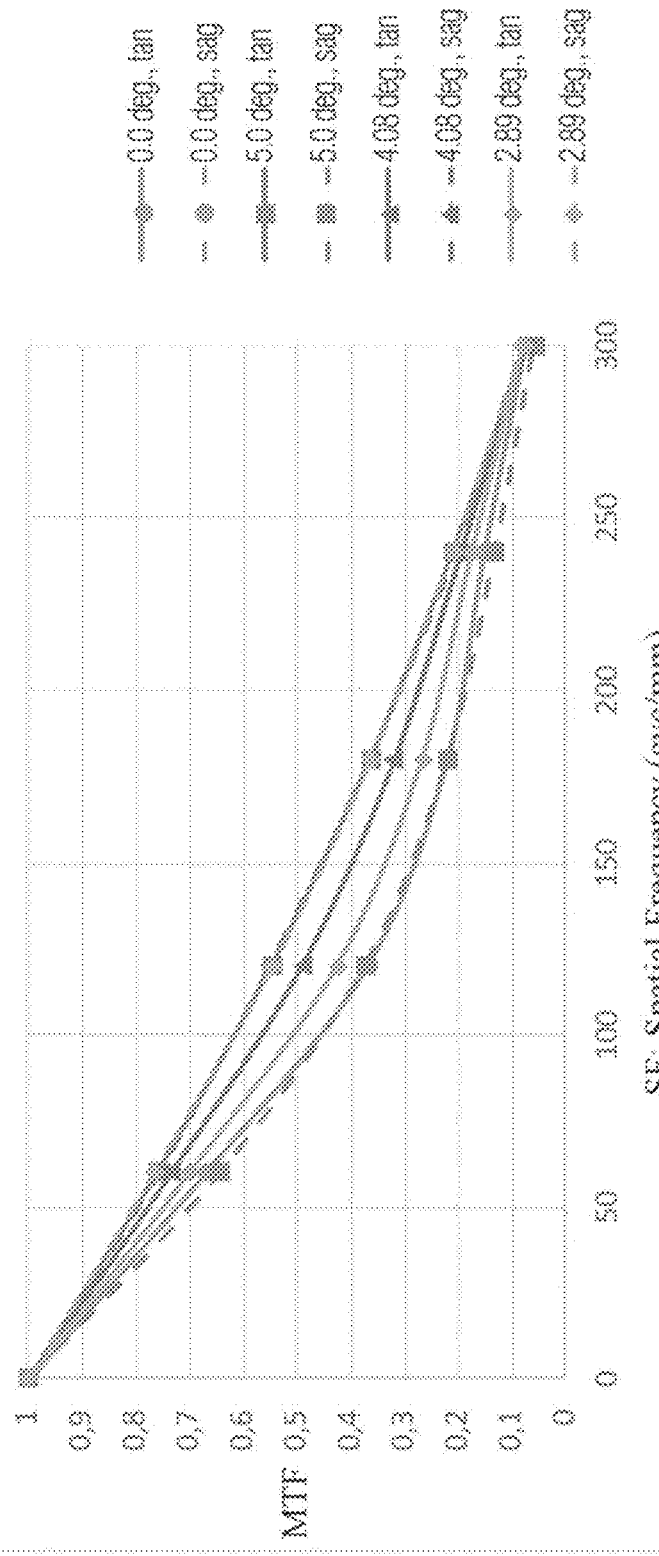
FIG. 10 illustrates a graph indicating a frequency-contrast characteristic with respect to different field points of the optical multi-pass imaging devices in FIGS. 9A and 9B.

FIG. 10 illustrates a graph indicating a frequency-contrast characteristic with respect to different field points of the optical multi-pass imaging devices according to the example embodiments as illustrated in FIGS. 9A and 9BB.

FIG. 10 illustrates a graph indicating a frequency-contrast characteristic of the optical multi-pass imaging device based on polarization coatings according to the example embodiment as illustrated in FIG. 9A with respect to various field points (0.0°; 5.0°; 4.08°; 2.89°) depending on a spatial frequency (SF). For example, the graph may show with what contrast the different frequencies are resolved.

In FIG. 10, a maximum frequency is 300 lines/mm. In the graph, at a frequency of 180 lines/mm, the contrast (MTF) exceeds the value of 0.2 for all the field points.

In the graph, an abscissa axis (or a horizontal axis) indicates a spatial frequency in lines/mm, and an ordinate axis (or a vertical axis) indicates a module of an OTF, that is MTF, indicating the contrast of the image.

Curves shown in FIG. 10 indicate MTF for different field points (0.0°; 5.0°; 4.08°; 2.89°) for two sections—tangential (YZ) and sagittal (XZ).

Table 3 below indicates design parameters of the optical multi-pass imaging device, including the following parameters: F-number (Fno)=5.0, Focal length (F') of the device=20.0 mm, Half the maximum field of view (HFOV)= 5.0°, Axial direction between the surface of the optical element 31 from the object side and the image plane, e.g., a TTL of the optical multi-pass imaging device=10.00 mm, and λ=0.55 µm: a radiation wavelength at which the optical element 31 operates.

TABLE 3

F' = 20.0 mm, Fno = 5.0, HFOV = 5.0 degrees, TTL = 10.0 mm, λ = 0.55 µm

|  | Radius | Axial thickness | Nd; Abbe number | Max. half-diameter | Conic. constant |
|---|---|---|---|---|---|
| 1-AD | −8.05 | 9.00 | 1.52; 64.2 | 2.00 | 0.49 |
| 2 | −17.45 | 1.00 |  | 3.30 | −1.16 |
| 3-SENSOR | infinity | — | — | 1.77 | — |

In Table 3 above, radius, axial thickness, and maximum half-diameter are indicated in mm.

The numbering of the surfaces from 1 to 3 in Table 3 indicates the surfaces of optical elements in order from the object to the image. In such a case, according to the example embodiment as illustrated in FIG. 9A, surface 1 may indicate the AD disposed on the concave surface of the optical element 31 which is the lens, and surfaces 1 and 2 may indicate the optical element 31, as indicated in Table 3 above. In addition, surface 3 may indicate the sensor 30 on which the image is formed.

The indicated design parameters of the optical multi-pass imaging device and the image capturing device according to the example embodiment as illustrated in FIG. 9A may provide a high image resolution, as the contrast (MTF) for all the field points exceeds 0.2 at a spatial frequency of 180 lines/mm, the sensor pixel size d is 2.8 µm (d=2.8 µm), the TTL is 10.00 mm (TTL=10.00 mm), and the F-number of the optical multi-pass imaging device is 5.0. In this case, a maximum incidence angle ($\alpha_{incidence}$) of light on the WGP may be 9.00°, a maximum incidence angle ($\alpha_{incidence}$) of light on the QWP may be 4.76°, and a maximum incidence angle ($\alpha_{incidence}$) of light on the ChLC layer may be 4.66°.

FIG. 9B illustrates an optical multi-pass imaging device according to another example embodiment.

Referring to FIG. 9B, there are provided an optical multi-pass imaging device based on polarization coatings, and an optical image capturing device including the optical multi-pass imaging device and a sensor 30.

The optical multi-pass imaging device according to the example embodiment as illustrated in FIG. 9B may include an optically coupled AD and one optical element 31 which is a lens having negative refractive power. An object-side surface of the lens may be concave, and an image-side surface of the lens may be convex.

The optical element 31, the WGP, the QWP, and the ChLC layer may form an optical element block having a front surface facing an object and a back surface facing an image plane.

In such a case, the AD may be disposed on a front surface of the optical element 31.

In the optical multi-pass imaging device based on polarization coatings according to the example embodiment as illustrated in FIG. 9B, the WGP and the QWP may be sequentially applied onto the front surface of the optical element block which is the surface of the optical element 31 facing the object.

The ChLC layer may be applied onto the convex surface of the optical element 31 facing the image.

All the design parameters of the optical multi-pass imaging device according to the example embodiment as illustrated in FIG. 9A as shown in Table 3 and the graph and description in FIG. 10 may be the same as the parameters of the optical multi-pass imaging device described here, and thus a repeated description will be omitted.

The indicated design parameters of the optical multi-pass imaging device and the image capturing device according to the example embodiment as illustrated in FIG. 9B may provide a high image resolution, as the contrast (MTF) for all the field points exceeds 0.2 at a spatial frequency of 180 lines/mm, the sensor pixel size d is 2.8 µm (d=2.8 µm), the TTL is 10.00 mm (TTL=10.00 mm), and the F-number of the optical multi-pass imaging device is 5.0. In this case, a maximum incidence angle of light ($\alpha_{incidence}$) on the WGP may be 9.00°, a maximum incidence angle ($\alpha_{incidence}$) of light on the QWP may be 9.00°, and a maximum incidence angle ($\alpha_{incidence}$) of light on the ChLC layer may be 4.66°.

The optical multi-pass imaging device and the optical image capturing device described herein may be widely applied to various compact electronic devices, such as, for example, a digital video camera, a digital still camera, a compact machine vision camera with a narrow field of view (FOV), a thermal imager with a narrow FOV, a smartphone, a personal computer with a camera, and a personal digital assistant (PDA) with a camera. The devices described herein may also be used to develop cameras for quadcopters and drones with RGB filters application.

While this disclosure includes example embodiments, it will be apparent to one of ordinary skill in the art that various changes in form and details may be made in these example embodiments without departing from the spirit and scope of the claims and their equivalents. The example embodiments described herein are to be considered in a descriptive sense only, and not for purposes of limitation. Descriptions of features or aspects in each example embodiment are to be considered as being applicable to similar features or aspects in other example embodiments. Suitable results may be achieved if the described techniques are performed in a different order, and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. An optical multi-pass imaging device comprising:
    an aperture diaphragm (AD);
    an optical element block comprising a front surface facing an object on which the AD is disposed and a back surface facing an image plane, the optical element block being optically coupled with the AD; and
    a sensor configured to be optically coupled with the optical element block and sense the image plane,
    wherein the optical element block comprises:
       at least one lens element;
       a wire grid polarizer (WGP);
       a quarter wave plate (QWP); and
       a cholesteric liquid crystal (ChLC) layer,
          wherein the WGP, the at least one lens element, the QWP, and the ChLC layer are disposed to provide a predetermined multi-transmission of radiation light from an object side to the image plane,
       wherein the optical element block further comprises at least one plane-parallel plate that is separate from the QWP.

2. The optical multi-pass imaging device of claim 1, wherein the WGP is disposed in front of or directly on the front surface of the optical element block, the ChLC layer is disposed behind or directly on the back surface of the optical element block, and the QWP is disposed between the WGP and the ChLC layer.

3. The optical multi-pass imaging device of claim 2, wherein the at least one lens element is configured to refract light that is incident at a predetermined angle,
    wherein the WGP is configured to transmit light of a first state of linear polarization and reflect light of a second state of linear polarization,
    wherein the QWP is configured to convert the light of the first state of linear polarization to light of a first state of circular polarization, convert the light of the first state of circular polarization to light of the second state of linear polarization, and convert the light of the second state of linear polarization to light of a second state of circular polarization, and
    wherein the ChLC layer is configured to reflect the light of the first state of circular polarization and transmit the light of the second state of circular polarization.

4. The optical multi-pass imaging device of claim 3, wherein one of the first state of linear polarization and the second state of linear polarization is a P-polarization state and the other of the first state of linear polarization and the second state of linear polarization is an S-polarization state.

5. The optical multi-pass imaging device of claim 3, wherein one of the first state of circular polarization and the second state of circular polarization is a right-handed circular polarization (RCP) state and the other of the first state of circular polarization and the second state of circular polarization is a left-handed circular polarization (LCP) state.

6. The optical multi-pass imaging device of claim 1, wherein the QWP has a fast axis and a slow axis disposed at an angle of 45 degrees relative to a polarization plane of the WGP.

7. The optical multi-pass imaging device of claim 1, wherein the QWP is disposed between the WGP and the ChLC layer or on the front surface of the optical element block, and
    wherein the QWP is configured to convert light to a predetermined polarization state.

8. The optical multi-pass imaging device of claim 1, wherein the QWP is disposed between the WGP and the ChLC layer or on the back surface of the optical element block, and
    wherein the QWP is configured to convert light to a predetermined polarization state.

9. The optical multi-pass imaging device of claim 1, wherein the optical element block further comprises another plane-parallel plate.

10. The optical multi-pass imaging device of claim 1, wherein each optical element of the optical element block is formed of an optically transparent material including one of optical glass, optical crystal, and polymer.

11. The optical multi-pass imaging device of claim 1, wherein the WGP has a thickness, a line period, and a line direction that correspond to a first state of linear polarization.

12. The optical multi-pass imaging device of claim 1, wherein each of the WGP, the QWP, and the ChLC layer is configured to retain a polarization property based on receiving a maximum incidence angle of the light that is below a threshold incidence angle.

13. An optical image capturing device comprising:
    an aperture diaphragm (AD);
    an optical element block comprising a front surface facing an object on which the AD is disposed and a back surface facing an image plane, the optical element block being optically coupled with the AD; and
    a sensor configured to be optically coupled with the optical element block and sense the image plane,
    wherein the optical element block comprises at least one lens element, a wire grid polarizer (WGP), a quarter wave plate (QWP), and a cholesteric liquid crystal (ChLC) layer, and
    wherein the WGP, the at least one lens element, the QWP, and the ChLC layer are disposed to provide a predetermined multi-transmission of light from an object side to the image plane.

14. The optical image capturing device of claim 13, wherein the sensor is a photodetector array.

15. The optical image capturing device of claim 13, further comprising:
    a filter disposed between the optical element block and the sensor.

16. The optical image capturing device of claim 15, wherein the filter is formed of optical glass, and is an infrared (IR) filter configured to remove noise from a record of IR light.

17. An optical multi-pass imaging device comprising:
    an aperture diaphragm (AD);
    an optical element block comprising a front surface facing an object on which the AD is disposed and a back surface facing an image plane, and the optical element block being optically coupled with the AD; and a sensor configured to be optically coupled with the optical element block and sense the image plane, wherein the optical element block comprises at least one lens element, a wire grid polarizer (WGP), a quarter wave plate (QWP), and a cholesteric liquid crystal (ChLC) layer, wherein the WGP is disposed in front of or directly on the front surface of the optical element block, the ChLC layer is disposed behind or directly on the back surface of the optical element block, and the QWP is disposed between the WGP and the ChLC layer, wherein the at least one lens element is configured to refract light incident at a predetermined angle, wherein the WGP is configured to transmit light of a first state of linear polarization and reflect light of a second state of linear polarization, wherein the QWP has a fast axis and a slow axis disposed at an angle of 45 degrees relative to a polarization plane of the WGP, and is configured to convert the light from the first state of linear polarization to a first state of circular polarization, convert the light from the first state of circular polarization to the second state of linear polarization, and convert the light from the second state of linear polarization to a second state of circular polarization, wherein the ChLC layer is configured to reflect the light of the first state of circular polarization and transmit the light of the second state of circular polarization, wherein the WGP, the at least one lens element, the QWP, and the ChLC layer are disposed to provide a predetermined multi-transmission of radiation light from an object side to the image plane, and wherein the optical element block further comprises at least one plane-parallel plate that is separate from the QWP.

18. The optical multi-pass imaging device of claim 17, wherein one of the first state of linear polarization and the second state of linear polarization is a P-polarization state and the other of the first state of linear polarization and the second state of linear polarization is an S-polarization state.

19. The optical multi-pass imaging device of claim 17, wherein one of the first state of circular polarization and the second state of circular polarization is a right-handed circular polarization (RCP) state and the other of the first state of circular polarization the second state of circular polarization is a left-handed circular polarization (LCP) state.

20. The optical multi-pass imaging device of claim 17, wherein the optical element block further comprises another plane-parallel plate.

* * * * *